E. W. CLOCKERS.
SPEED WAGON.
APPLICATION FILED MAR. 17, 1919.
1,318,847.
Patented Oct. 14, 1919.
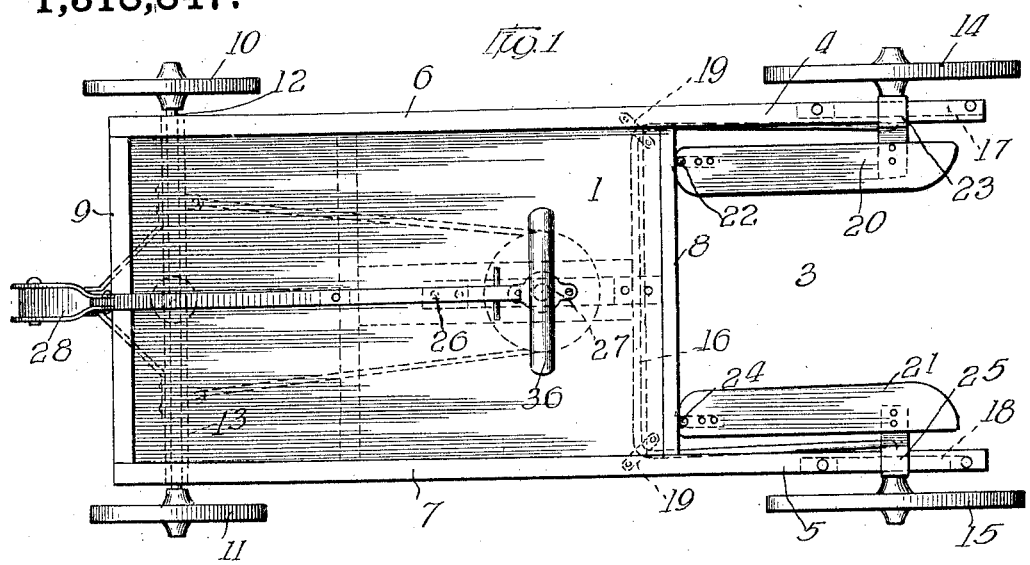
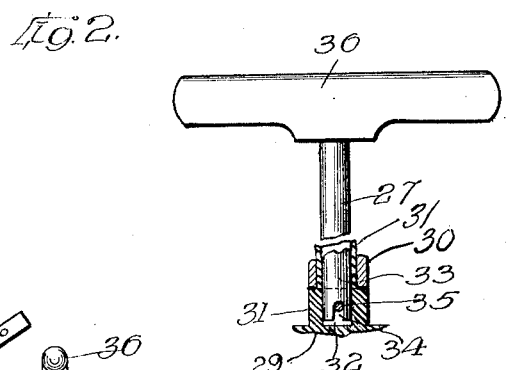
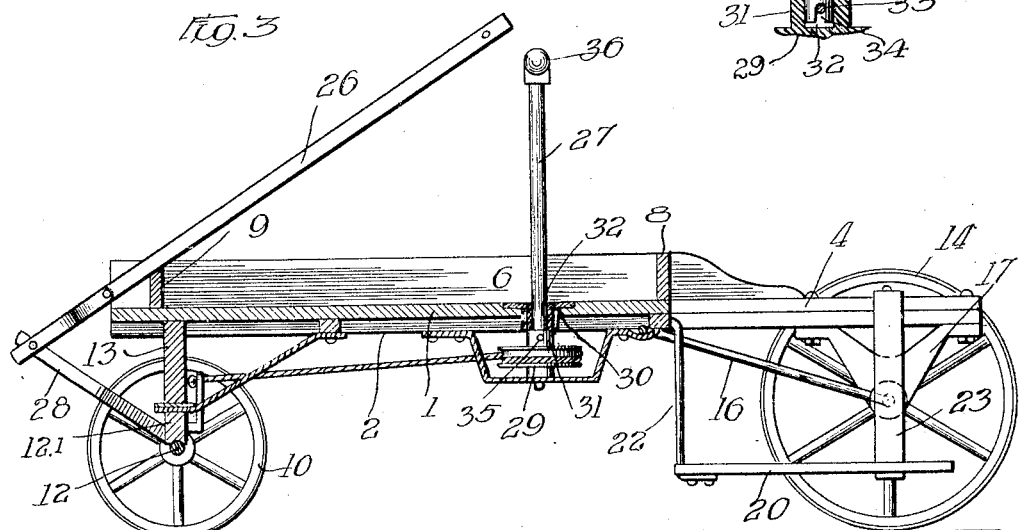
Witnesses
Harry R. L. White
U. P. Kilroy
Inventor
Eric W. Clockers
by Rummler & Rummler, Attys

UNITED STATES PATENT OFFICE.

ERIC W. CLOCKERS, OF CHICAGO, ILLINOIS.

SPEED-WAGON.

1,318,847. Specification of Letters Patent. Patented Oct. 14, 1919.

Application filed March 17, 1919. Serial No. 283,067.

*To all whom it may concern:*

Be it known that I, ERIC W. CLOCKERS, a citizen of the United States of America, and a resident of Chicago, county of Cook, and State of Illinois, have invented certain new and useful Improvements in Speed-Wagons, of which the following is a specification.

The main objects of this invention are to provide an improved form of speed wagon adapted to enable a child to rest one foot on the rear end of the wagon and treadle the ground with the other, while steering with the hands; to provide an improved arrangement of a foot-rest at the rear of a speed wagon for supporting one foot, which will allow the foot with which the treadling is done to be moved forwardly as well as backwardly of the foot resting on the wagon; to provide an improved arrangement of the rear end of the wagon whereby a foot-rest for either foot is arranged and either foot may be used for treadling the ground; to provide an improved arrangement of the rear axle and mounting of the rear wheels of the wagon to afford space for arrangement of this kind; to provide an improved arrangement of the steering mechanism to enable the child to readily steer the wagon from the rear; and to provide an improved arrangement of said steering mechanism whereby it may be quickly removed to permit the wagon to be used in the ordinary way for hauling articles.

An illustrative embodiment of this arrangement is shown in the accompanying drawings, in which—

Figure 1 is a top plan of a wagon constructed in accordance with this invention.

Fig. 2 is a detail, partly sectional, of a part of the special steering mechanism.

Fig. 3 is a longitudinal sectional elevation of a wagon such as illustrated in Fig. 1.

In the specific embodiment herein illustrated the body of the wagon comprises a bottom member 1 supported on side rails 2 and having an open space 3 extending inwardly from the rear end thereof so as to provide a pair of rearwardly extending arms 4 and 5. Side members 6 and 7 and end members 8 and 9 form a bed for said body forwardly of the open space 3.

A pair of wheels 10 and 11 are journaled on an axle 12 and connected to a bolster 12.1 which is rotatably mounted on the bolster 13 rigidly secured to the underside of the bottom member 1. A pair of rear wheels 14 and 15 are journaled on the ends of a rod or axle 16, which ends extend through and are supported on bearings 17 and 18 respectively suspended from the rear ends of the arms 4 and 5. The rod or axle 16 between the bearings 17 and 18 is bent to extend forwardly along the arms 4 and 5 and across the body adjacent to the rear end thereof. Suitable clips 19 secure the rod or axle 16 to the bottom 1 of the body.

Foot-rests or ledges 20 and 21 are suspended from the arms 4 and 5 respectively by means of braces 22 and 23, and 24 and 25. These ledges 20 and 21 are located below the level of the bottom 1 of the body rather close to the ground, and for the most part forwardly of the axis of the axle 16. Being thus arranged at the sides of the body, an unobstructed space is provided between the foot rests or ledges so that a child using the wagon may support one foot on one or the other of the ledges 20 or 21 and with the other foot treadle the ground forwardly as well as rearwardly of the foot resting on the ledge or foot-rest.

The steering mechanism for the wagon comprises a tongue 26 for use in pulling the wagon and a steering post 27 for special use when the child is riding on the rear end of the wagon. The tongue 26 is hingedly connected to a brace 28 extending forwardly and upwardly from the bolster 12.1. The brace 28 extends forward of the body sufficiently to permit the tongue 26 to extend rearwardly over the body (as indicated in full outline in Fig. 3) and thereby enable the child to use the tongue for steering if for any reason it is not convenient to make use of the steering post 27.

The steering post 27, when used, coacts with a member 29 having a shaft 31 journaled in a bearing 30 located on the bottom 1 of the body adjacent to the rear end thereof and being connected by a cable to the bolster 12.1. The bearing 30 is substantially flush with the inside of the bottom 1 of the body. The shaft 31 is provided with an opening 32 extending axially inward from the upper end thereof into which the end 33 of the steering post 27 is adapted to fit. Said post is provided with a recess 34 which is adapted to fit over a lug or shoulder 35 formed in or connected to the shaft 31. The post 27 has a cross bar 36 which the child may grasp with the hands for supporting itself while treadling, and also for steering.

By making the steering post 27 detachable it permits one to make use of the wagon in the ordinary way for hauling articles in the compartment formed by the sides and ends.

The operation of the speed wagon is believed to be readily apparent from the foregoing description, so that no further explanation is required.

Although but one specific embodiment of this invention has been herein shown and described, it will be understood that numerous details of the construction shown may be altered or omitted without departing from the spirit of this invention as defined by the following claims.

I claim:

1. In a speed wagon, the combination of a body mounted on wheels, steering mechanism for guiding said wagon, said body having its rear part formed with an open space extending inwardly from the end, and a ledge arranged on one side of said body within said opening and having the space between said ledge and the opposite side of said body and the forward end of said ledge rearwardly unobstructed by any part of the wagon structure, said ledge being adapted to serve as a foot-rest for one foot and allow the other foot to treadle the ground forwardly and rearwardly of said one foot, substantially as described.

2. In a speed wagon, the combination of a body mounted on wheels, steering mechanism for guiding said wagon, said body having its rear part formed with an open space extending inwardly from the end, and ledges arranged on each side of said body within said open space, and having the space between said ledges rearwardly of their forward ends unobstructed by any part of the wagon structure, whereby one foot may rest upon one ledge and allow the other foot to treadle the ground forwardly and rearwardly of said one foot.

3. In a speed wagon, the combination of a body mounted on wheels, steering mechanism for guiding said wagon, and ledges extending rearwardly from the main part of said body at the sides thereof so as to provide foot-rests adjacent to each of the rear wheels of said wagon, said ledges having the space between them rearwardly from a point in advance of the axis of said rear wheels unobstructed by any part of the wagon structure, whereby one foot may rest upon one ledge and allow the other foot to treadle the ground forwardly and rearwardly of said one foot.

4. In a speed wagon, the combination of a body having an open space extending inwardly from the rear end thereof so as to provide a pair of rearwardly extending arms, a pair of wheels rotatably mounted on the forward end of said body, a pair of rear wheels journaled on said arms in axial alinement with each other, a foot-rest suspended from each of said arms below said body, said foot rests having the space between them rearwardly from a point in advance of the axis of said rear wheels unobstructed by any part of the wagon structure, whereby one foot may rest upon one foot-rest and allow the other foot to treadle the ground forwardly and rearwardly of said one foot, and steering mechanism connected to said front wheels so as to be actuated from the rear of said wagon.

5. In a speed wagon, the combination of a body having an open space extending inwardly from the rear end thereof so as to provide a pair of rearwardly extending arms, a bearing suspended from the under side of each of said arms, a rod having the opposite ends thereof supported in and extending through said bearings, a wheel journaled on each end of said rod, said rod having the part thereof between said bearings extending forwardly along said arms and across said body adjacent to the rear part thereof, a foot-rest suspended from each of said arms inwardly of said bearings below the bottom of said body, said foot rests having the space between them rearwardly from a point in advance of the axis of said rear wheels unobstructed by any part of the wagon structure, whereby one foot may rest upon one foot-rest and allow the other foot to treadle the ground forwardly and rearwardly of said one foot, and steering mechanism connected to said steering wheels and arranged to be actuated from the rear of said wagon.

6. In a speed wagon, the combination of a body having an open space extending inwardly from the rear end thereof so as to provide a pair of rearwardly extending arms, a pair of wheels rotatably mounted on the forward end of said body, a pair of rear wheels journaled on said arms in axial alinement with each other, a foot-rest suspended from each of said arms below said body, a member rotatably mounted on the under side of said body adjacent to said opening, means connecting said rotatable member with said steering wheels, and a steering post rigidly supported in upright position on said body adjacent to the rear end thereof and connected to said rotatable member.

7. In a speed wagon, the combination of a body having an open space extending inwardly from the rear end thereof so as to provide a pair of rearwardly extending arms, a pair of wheels rotatably mounted on the forward end of said body, a pair of rear wheels journaled on said arms in axial alinement with each other, a foot-rest suspended from each of said arms below said body, a member rotatably mounted on the under side of said body adjacent to said opening, means connecting said rotatable member with said steering wheels, said body member having an opening through the bottom thereof leading to said rotatable member, a steering post adapted to be inserted into said opening, and coacting means on said steering post and member adapted to detachably connect the same together.

Signed at Chicago this 15th day of March, 1919.

ERIC W. CLOCKERS.

Copies of this patent may be obtained for five cents each, by addressing the "Commissioner of Patents, Washington, D. C."